United States Patent
Colebrooke

(10) Patent No.: US 12,378,899 B2
(45) Date of Patent: Aug. 5, 2025

(54) DUCTING ARRANGEMENT FOR A GAS TURBINE ENGINE

(71) Applicant: ROLLS-ROYCE plc, London (GB)

(72) Inventor: Jack F Colebrooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/794,116

(22) Filed: Aug. 5, 2024

(65) Prior Publication Data

US 2025/0075639 A1 Mar. 6, 2025

(30) Foreign Application Priority Data

Aug. 31, 2023 (GB) .................................... 2313238

(51) Int. Cl.
*F01D 25/28* (2006.01)
*F02C 7/20* (2006.01)

(52) U.S. Cl.
CPC ............... *F01D 25/28* (2013.01); *F02C 7/20* (2013.01); *F05D 2240/55* (2013.01); *F05D 2260/30* (2013.01)

(58) Field of Classification Search
CPC . F01D 25/28; F02C 7/20; F02K 1/822; F02K 1/82; F02K 1/80; F05D 2230/642; F05D 2260/30
See application file for complete search history.

(56) References Cited

U.S. PATENT DOCUMENTS

| | | |
|---|---|---|
| 2013/0319007 A1 | 12/2013 | Peters |
| 2014/0047848 A1 | 2/2014 | Peters |
| 2014/0053564 A1 | 2/2014 | Martin |
| 2014/0069106 A1* | 3/2014 | Preston, III ............. F02K 1/822 |
| | | 29/888.01 |
| 2014/0157782 A1 | 6/2014 | Kramer |
| 2017/0152761 A1 | 6/2017 | McMahon et al. |
| 2018/0328227 A1* | 11/2018 | King ....................... F01D 25/30 |

OTHER PUBLICATIONS

Jan. 29, 2024 Search Report issued in British Patent Application No. GB2313238.4.

* cited by examiner

*Primary Examiner* — Andrew H Nguyen
(74) *Attorney, Agent, or Firm* — Oliff PLC

(57) ABSTRACT

A ducting arrangement for a gas turbine engine and a method of assembling such a ducting arrangement, wherein in the gas turbine engine includes an outer annular duct structure with an outer mount and an inner annular duct structure with an inner mount. The inner annular duct structure is configured to be received within the outer annular duct structure such that the inner mount and the outer mount are angularly aligned. In one aspect, the inner mount and the outer mount are coupled together by a tension tie to attach the outer annular duct structure to the inner annular duct structure, the tension tie being a cable or a wire. In another aspect, the inner mount and the outer mount are configured to be coupled together by a tension tie formed by a cable or a wire to attach the outer annular duct structure to the inner annular duct structure.

19 Claims, 5 Drawing Sheets

DUCTING ARRANGEMENT FOR A GAS TURBINE ENGINE

This specification is based upon and claims the benefit of priority from UK Patent Application Number 2313238.4 filed on 31$^{st}$ August, the entire contents of which are incorporated herein by reference.

BACKGROUND

Technical Field

The present disclosure concerns a ducting arrangement for a gas turbine engine as well as an attachment system for use in such a ducting arrangement and a gas turbine engine comprising such a ducting arrangement. The present disclosure also concerns a method of assembling a ducting arrangement for a gas turbine engine.

Background

An attachment system for a gas turbine engine may generally comprise means of attaching a relatively hot structure (e.g., an exhaust liner) to a relatively cold structure (e.g., an engine casing). The attachment system should be able to attenuate lateral movement from thermal expansion of the hot structure while also being able to resist displacement a pressure load due to a pressure differential on either side of one of the structures, especially the hot structure. The attachment system should also be able to tolerate manufacturing imprecision.

Known attachment systems may comprise a sliding element or a flexible structure for connecting the hot and cold structure. However, a flexible structure is prone to cracking and fatigue, with expected operational life being hard to estimate in a high vibration environment such as a gas turbine engine. Sliding structures, whilst considered more robust than flexible structures, are associated with various problems. For instance, each structure requires many coplanar mounts in order to adequately distribute the expected pressure load. In addition, these surfaces of the coplanar mounts must be tightly toleranced to enable the parts to correctly assemble. Producibility of such a complex fabrication with numerous tightly toleranced interfacing surfaces is low. Such features may also require adaptive machining, as well as setting shims. This increases manufacturing complexity and makes maintenance more challenging. Further, the amount of friction between the sliding surfaces is also difficult to assess in high temperature, high vibration environments. If the sliding fiction is too high, additional loads are transferred to the liner resulting in thermally driven buckling. The present disclosure has been devised with the foregoing in mind.

US 2014/069106 A1 describes a hanger assembly for supporting a liner within a gas turbine engine exhaust nozzle which includes a first mount for attachment to a case and a second mount for attachment to the liner. A u-joint assembly is attached between the first and second mounts and includes a first yoke and a second yoke aligned transverse to the first yoke. A pivot block includes a first set of pins received by the first yoke and a second set of pins received by the second yoke. The u-joint assembly accommodates relative movement between the liner and case.

US 2014/157782 A1 describes a liner and attachment structure for a gas turbine engine. At least one hanger has feet secured to the liner. The hanger has an aperture extending at a central web. A flanged washer is received within the opening in the hanger. The flanged washer allows adjustment relative to the hanger. The flanged washer has a spherical recess. A collet has a plurality of part-spherical fingers separated by slots and are received in the spherical recess of the flanged washer. A member extends into the collet to hold the part-spherical fingers radially outwardly. The member is also utilized to secure static structure, and to secure the liner to the static structure.

US 2014/053564 A1 describes a hanger for a gas turbine exhaust system including an exhaust duct attachment structure associated with an exhaust duct and a liner attachment structure associated with a liner spaced radially inwardly of the exhaust duct. The exhaust duct attachment structure and the liner attachment structure cooperate to suspend the liner within the exhaust duct such that the exhaust duct and liner are movable relative to each other. At least one resilient member generates a resilient biasing force between the exhaust duct attachment structure and the liner attachment structure.

SUMMARY

According to a first aspect of the present disclosure, there is provided a ducting arrangement for a gas turbine engine, the ducting arrangement comprising: an outer annular duct structure provided with an outer mount, and an inner annular duct structure provided with an inner mount, wherein: the inner annular duct structure is configured to be received within the outer annular duct structure such that the inner mount and the outer mount are angularly aligned; and the inner mount and the outer mount are coupled together by a tension tie to attach the outer annular duct structure to the inner annular duct structure, the tension tie being a cable or a wire.

The tension tie may comprise, or be formed from, a metal.

It may be that the tension tie is configured to oppose movement of the outer annular duct structure relative to the inner annular duct structure along a radial direction of the ducting arrangement.

It may be that the tension tie is provided with a ferrule configured to fasten a first portion of the tension tie to a second portion of the tension tie to form a loop of the tension tie engaging each of the mounts.

The tension tie may form part of an attachment system which further comprises a housing. The tension tie may extend at least partially through an interior of the housing.

The housing may extend from one of the outer annular duct structure and the inner annular duct structure. The housing may extend partially therebetween such that a gap is defined between the housing and an opposing one of the annular duct structures. The housing may abut the outer annular duct structure. The gap may be defined between the housing and the inner annular duct structure.

The outer mount may be defined by the housing. If so, the inner mount may be fixedly attached to the inner annular duct structure. The housing may extend through an aperture formed in the outer annular duct structure. The housing may include a flange which abuts an outer surface of the outer annular duct structure.

It may be that the attachment system further comprises a cap affixed to the housing. If so, the cap may seal the interior of housing from an exterior of the outer annular duct structure.

It may be that the housing defines at least one inlet for gas exchange between the interior of the housing and a gas passageway defined between the inner annular duct structure and the outer annular duct structure.

It may be that the housing defines an engagement portion configured to cooperate with a complementary engagement portion fixedly attached to the inner annular duct structure to limit movement of the inner annular duct structure relative to the outer annular duct structure along a radial direction of the ducting arrangement.

The engagement portion defined by the housing may be in the form of a shoulder and the complementary engagement portion defined by the inner annular duct structure may be in the form of a hook configured to engage the shoulder.

The tension tie may be spaced apart from the housing.

It may be that the inner annular duct structure and the outer annular duct structure define a first gas passageway therebetween, the first gas passageway being configured to convey a bypass flow of air from a fan of the gas turbine engine. It may also be that the inner annular duct structure defines a second gas passageway, the second gas passageway being configured to convey an exhaust flow of air from a core of the gas turbine engine. It may be that the outer annular duct structure is an engine casing. It may be that the inner annular duct structure is an exhaust liner.

According to a second aspect of the present disclosure, there is provided a ducting arrangement for a gas turbine engine, comprising: an outer annular duct structure provided with an outer mount, and an inner annular duct structure provided with an inner mount, wherein: the inner annular duct structure is configured to be received within the outer annular duct structure such that the inner mount and the outer mount are angularly aligned; the inner mount and the outer mount are configured to be coupled together by a tension tie formed by a cable or a wire to attach the outer annular duct structure to the inner annular duct structure. Further, the inner mount and the outer mount may each be configured to extend through an opening of the tension tie.

It may be that the inner mount and the outer mount each extend along a circumferential direction or an axial direction of the ducting arrangement to define respective surfaces for receiving the tension tie.

It may be that the ducting arrangement further comprises the tension tie, and wherein the tension tie at least partially extends around each of the mounts to couple the mounts together.

It may be that the inner annular duct structure and the outer annular duct structure define a first gas passageway therebetween, the first gas passageway being configured to convey a bypass flow of air from a fan of the gas turbine engine. It may also be that the inner annular duct structure defines a second gas passageway, the second gas passageway being configured to convey an exhaust flow of air from a core of the gas turbine engine. It may be that the outer annular duct structure is an engine casing. It may be that the inner annular duct structure is an exhaust liner.

According to a third aspect of the present disclosure, there is provided an attachment system suitable for use as the attachment system in a ducting arrangement in accordance with the first aspect or the second aspect.

According to a fourth aspect of the present disclosure, there is provided a gas turbine engine comprising a ducting arrangement in accordance with the first aspect or the second aspect and/or an attachment system in accordance with the third aspect.

According to a fifth aspect of the present disclosure, there is provided a method of assembling a ducting arrangement for a gas turbine engine, the method comprising: disposing an inner annular duct structure at least partially inside an outer annular duct structure; mounting the inner annular duct structure to the outer annular duct structure using a tension tie, the tension tie being a cable or a wire.

The method may be to form a ducting arrangement in accordance with the first aspect or the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only bye the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e., the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e., the portion radially outside any platform.

The radius of the fan may be measured between the engine centreline and the tip of a fan blade at its leading edge. The fan diameter (which may simply be twice the radius of the fan) may be greater than (or on the order of) any of: 210 cm, 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 cm (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e., the values may form upper or lower bounds), for example in the range of from 210 cm to 240 cm, or 250 cm to 280 cm, or 330 320 cm to 380 cm.

The rotational speed of the fan may vary in use. Generally, the rotational speed is lower for fans with a higher diameter. Purely by way of non-limitative example, the rotational speed of the fan at cruise conditions may be less than 2600 rpm, for example less than 2500 rpm, for example less than 2300 rpm. Purely by way of further non-limitative example, the rotational speed of the fan at cruise conditions for an engine having a fan diameter in the range of from 220 210 cm to 300 cm (for example 240 cm to 280 cm or 250 cm to 270 cm) may be in the range of from 1700 rpm to 2500 2600 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/Utip^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e., the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest-pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds), for example in the range of from 80 Nkg-1s to 100 Nkg-1s, or 85 Nkg-1s to 95 Nkg-1s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 130 kN, 135 kN, 140 kN, 145 kN, 150 kN, 155 kN, 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 155 kN to 170 kN, 330 kN to 420 kN, for example or 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high-pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1520 K, 1530 K, 1540 K, 1550 K, 1600 K or 1650 K. The TET at cruise may be in an inclusive range bounded by any two of the values in the previous sentence (i.e., the values may form upper or lower bounds), for example 1530 K to 1600 K. The maximum TET in use of the engine may be, for example, at least (or on the order of) any of the following: 1700 K, 1750 K, 1800 K, 1850 K, 1900 K, 1950 K or 2000 K. The maximum TET may be in an inclusive range bounded by any two of the values in the previous sentence (i.e., the values may form upper or lower bounds), for example in the range of from 1800 K to 1950 K, or 1900 K to 2000 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint-in terms of time and/or distance-between top of climb and start of descent). Cruise conditions thus define an operating point of the gas turbine engine that provides a thrust that would ensure steady state operation (i.e., maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft-steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example, 0.76 to 0.84, for example, 0.77 to 0.83, for example, 0.78 to 0.82, for example, 0.79 to 0.81, for example, on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to a forward Mach number of 0.8 and standard atmospheric conditions (according to the International Standard Atmosphere) at an altitude of 35000 ft (10668 m). At such cruise conditions, an operating point of the engine provides a known required net thrust level. The known required net thrust level is, of course, dependent on the engine and its intended application and may be, (for example, a value in the range of from 230 kN to 4035 kN.) at a forward Mach number of 0.8 and standard atmospheric conditions (according to the International Standard Atmosphere) at an altitude of 38000 ft (11582 m).

Purely by way of further example, the cruise conditions may correspond to a forward Mach number of 0.85 and standard atmospheric conditions (according to the International Standard Atmosphere) at an altitude of 38000 ft (11582 m). At such cruise conditions, the engine may provide a known required net thrust level. The known required net thrust level is, of course, dependent on the engine and its intended application and may be, for example, a value in the range of from 35 kN to 65 kN.an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect of the present disclosure, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect of the present disclosure, there is provided a method of operating a gas turbine engine as described and/or claimed herein. The operation may be at the cruise conditions as defined elsewhere herein (for example in terms of the thrust, atmospheric conditions and Mach Number).

According to an aspect of the present disclosure, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
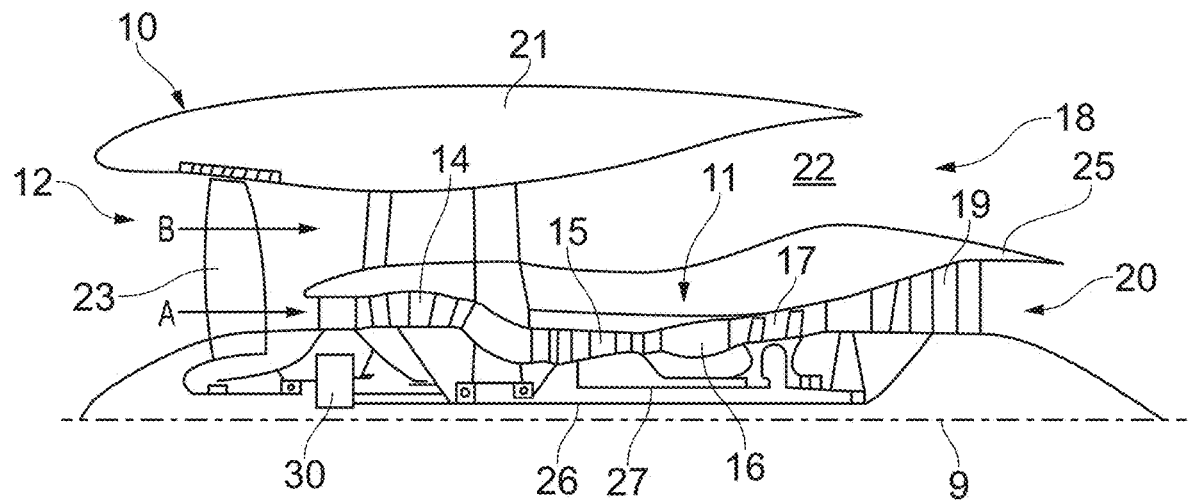
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
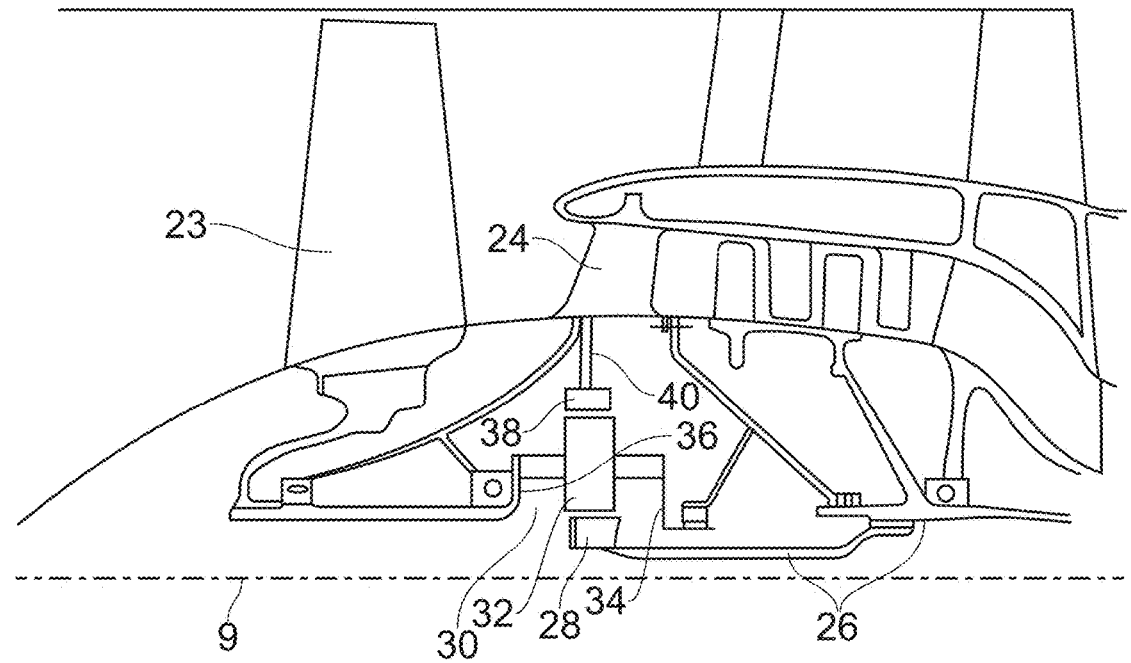
FIG. 2 is a close-up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
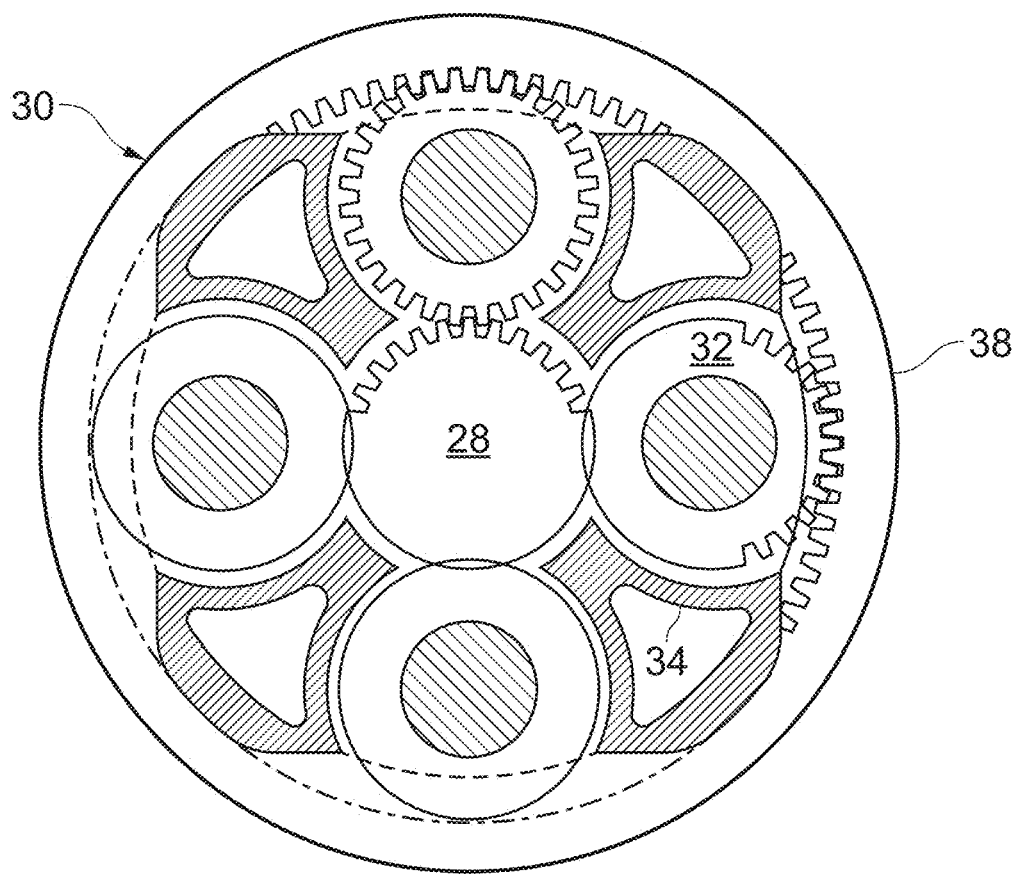
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the present disclosure. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In the example of FIG. 1, the bypass duct 22 (e.g., the nozzle 18 of the bypass duct 22) is separated from the core engine nozzle 20 by an exhaust liner 25. In this specific example, the nacelle 21 comprises an engine casing 21' having an internal surface 22\* which defines the bypass duct 22 (e.g., the bypass duct nozzle 18). In other examples, the gas turbine engine may not comprise a nacelle (e.g., if the gas turbine engine is integrated into an airframe structure) and the engine casing 21' may be otherwise included within the gas turbine engine. The exhaust liner 25 and the engine casing 21' together form part of a ducting arrangement of the gas turbine engine 10. Example ducting arrangements in accordance with the present disclosure will now be described in further detail with reference to FIGS. 4 to 5.

Figure 4:
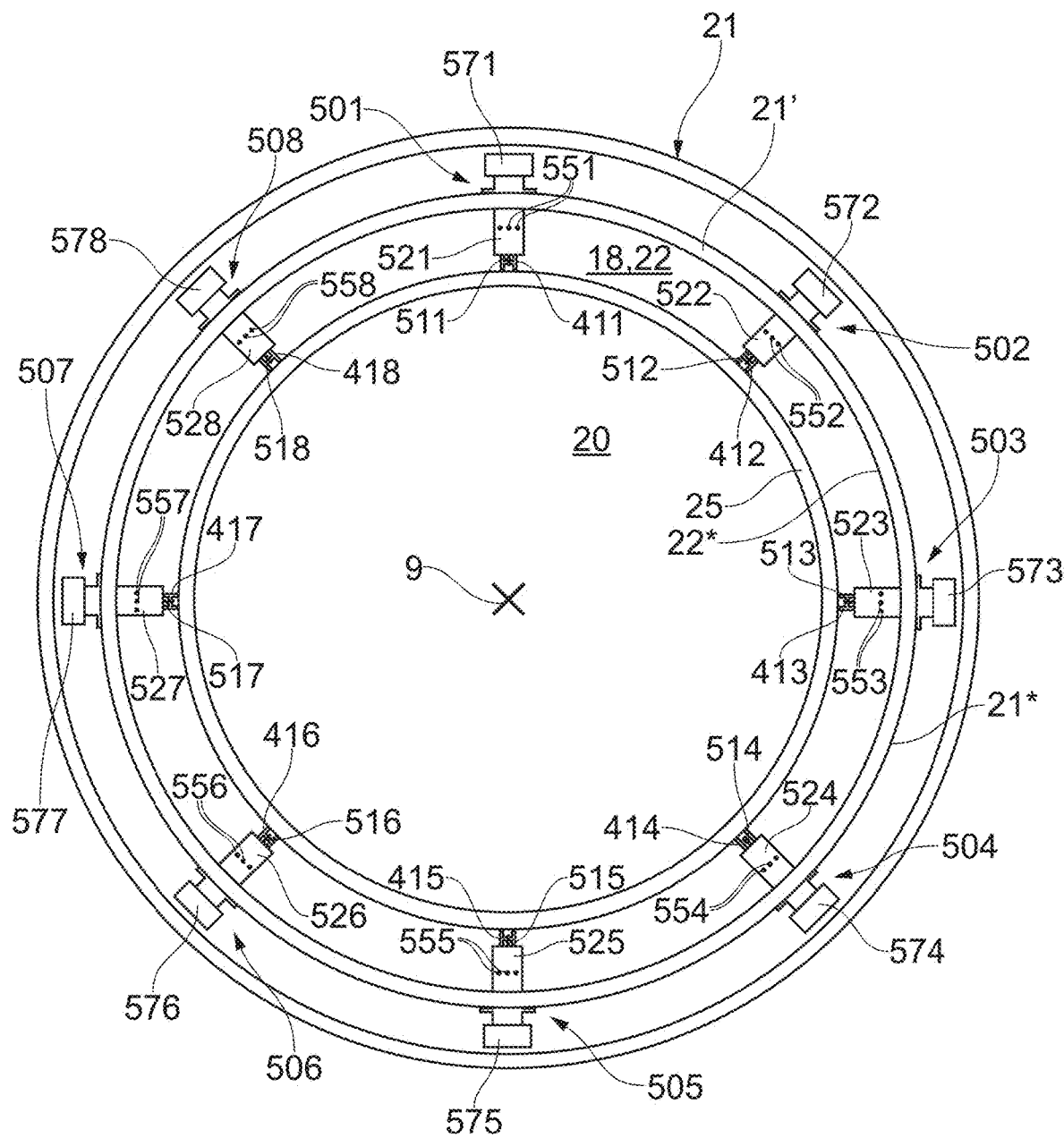
FIG. 4 is an end view of a ducting arrangement for a gas turbine engine.
Figure 4:
Figure 5:
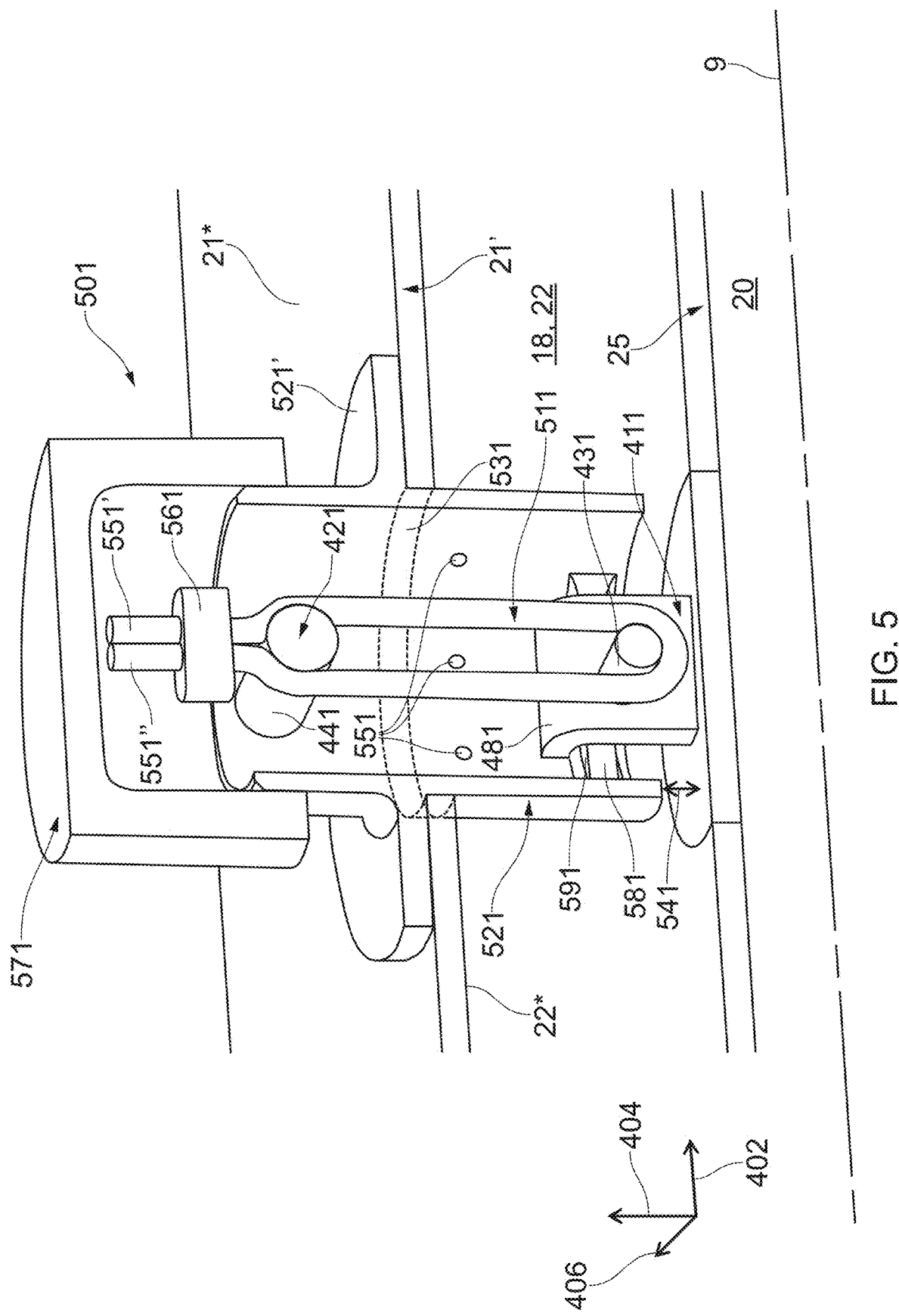
FIG. 5 is a detailed perspective cross-sectional view of the ducting arrangement shown by FIG. 4.

FIG. 4 is an end view of an example ducting arrangement 400 for incorporation within a gas turbine engine (e.g., the gas turbine engine 10 described above with reference to FIGS. 1 to 3). The ducting arrangement 400 comprises a plurality of angularly distributed attachment systems 501-508. In this example, the ducting arrangement 400 comprises eight angularly distributed attachment systems 501-508. However, in other examples, the ducting arrangement 400 may comprise a different number of attachment systems 501-508. FIG. 5 is a perspective cross-sectional view of the ducting arrangement 400 of FIG. 4 showing one of the (e.g., a first) attachment systems 501 in detail. Any of the other attachment systems 502-508 may have any or all of the features described herein with respect to the first attachment system 501. For ease of reference, a coordinate system is shown on each of FIGS. 4 and 5. The coordinate system specifies an axial direction 402, a radial direction 404 and a circumferential direction 406 of the ducting arrangement 400. The coordinate system is defined such that, when the ducting arrangement 400 is incorporated within the gas turbine engine 10, the axial direction 402 is parallel to the axial direction of the gas turbine engine (and therefore the rotational axis 9 for most engines), the radial direction 404 is parallel to a radial direction of the gas turbine engine 10 and the circumferential direction 406 corresponds to the circumferential direction of the gas turbine engine 10.

The example ducting arrangement 400 comprises the exhaust liner 25 and the engine casing 21', each of which are annular structures. The engine casing 21' is disposed radially outward of the exhaust liner 25. Accordingly, the engine casing 21' is referred to as an outer annular duct structure 21' and the exhaust liner 25 is referred to as an inner annular duct structure 25. The bypass duct nozzle 18 may be referred to as a first gas passageway configured to convey the bypass flow of air B from the fan 23 of the gas turbine engine 10 and the core engine nozzle 20 may be referred to as a second gas passageway configured to convey the core flow of air A and the core 11 of the gas turbine engine 10 (e.g., an exhaust flow of air). However, it will be appreciated that other example ducting arrangements envisaged by the present disclosure may comprise an outer annular duct structure 21' which is not an engine casing and/or an inner annular duct structure 25 which is not an exhaust liner. In such examples, the outer annular duct structure 21' may be a relatively cold structure in use and the inner annular duct structure 25 may be a relatively hot structure in use.

The exhaust liner 25 is provided with a plurality of mounting features 411-418, herein referred to as inner mounts 411-418. In some examples, the exhaust liner 25 may itself define (e.g., comprise) each of the inner mounts 411-418. In other examples, the exhaust liner 25 may be provided with each of the inner mounts 411-418 by associated features which define the inner mounts 411-418. Each of the plurality of inner mounts 411-418 are angularly distributed around the axial direction 402 throughout an annular extent of the exhaust liner 25 (as best shown by FIG. 4). Similarly, the engine casing 21' is provided with a plurality of mounting features 421-428, herein referred to as outer mounts 421-428. Each of the plurality of outer mounts 421-428 are angularly distributed around the axial direction 402 throughout an annular extent of engine casing 21'. In some examples, the engine casing 21' may itself define (e.g., comprise) each of the outer mounts 421-428. In other examples, the engine casing 21' may be provided with each of the outer mounts 421-428 by associated features which define the outer mounts 421-428 (e.g., by respective housings which abut the engine casing 21', as in the example of FIGS. 4 and 5 and described in further detail below). The circumferential distribution of the inner mounts 411-418 and the outer mounts 421-428 is such that each inner mount 411-418 is angularly aligned with a corresponding outer mount 421-428 when the exhaust liner 25 is received and appropriately located within the engine casing 21'.

The plurality of attachment systems 501-508 are angularly distributed around the annular extent of the ducting arrangement 400 at locations corresponding to respective pairs of aligned inner and outer mounts 411-418, 421. Each attachment system 501-508 includes a respective tension tie 511-518 and a respective housing 521-528. In the example of FIGS. 4 and 5, the housing 521-528 of each attachment system 501-508 extends through a corresponding aperture 531 formed in the engine casing 21' (shown only by FIG. 5). Each housing 521-528 includes a flange 521' (shown only by FIG. 5) which abuts an external surface 21* of the engine casing 21'. Further, each outer mount 421-428 is defined by a respective housing 521-528 and each inner mount 411-418 is fixedly attached to (and may be defined by) the exhaust liner 25. Accordingly, each housing 521-528 partially extends above the external surface 21*. The flange 521' extends around a perimeter of the housing 521-528 over the aperture 531 to seal the bypass duct 22 from a space radially outward of the external surface 21*. In addition, in the example of FIGS. 4 and 5, an external profile of each housing 521-528 is generally in the form of a prism (e.g., a cylinder). However, other forms for the housing(s) 521-528 are envisaged.

Each tension tie 511-518 is a cable or a wire which may comprise (e.g., being substantially formed from) a metal (e.g., a metal alloy). Each tension tie 511-518 extends along the radial direction 404 of the ducting arrangement 400 through an interior of the respective housing 521-528 between (e.g., to each of) one of the inner mounts 411-418 and a corresponding outer mount 421-428 to couple a corresponding pair of the mounts 411-418, 421-428 together and thereby attach the exhaust liner 25 to the engine casing 21'. Each corresponding pair of mounts 411-418, 421-428 are configured to be coupled together by a respective tension tie 511-518. Each tension tie 511-518 is therefore configured to oppose movement of the exhaust liner 25 with respect to the engine casing 21' in a direction parallel to the radial direction 404 of the ducting arrangement 400 as a consequence of a tensile stress induced therein. In other words, each tension tie 511-518 is configured to oppose an increase in a distance (e.g., a distance along the radial direction 404, which may be referred to as a radial distance) between the exhaust liner 25 and the engine casing 21'. To this end, each inner mount 411-418 and each outer mount 421-428 extends along the circumferential direction 406 of the ducting arrangement 400 to define an inner circumferentially extending reception surface 431 and an outer circumferentially extending reception surface 441, respectively. Each circumferentially extending reception surface 431, 441 is configured to receive (e.g., engage) the tension tie 511-518. In particular, the tension tie 511-518 extends around each of the circumferentially extending reception surfaces 411-418, 421-428 to couple the mounts 411-418, 421-428 together. This disclosure also envisages that each inner mount 411-418 and each outer mount 421-428 may extend along the axial direction 402 of the ducting arrangement 400 to define an inner axially extending reception surface and an outer axially extending reception surface for the same purpose (i.e., to receive the tension tie 511-518).

In use, each tension tie 511-518 opposes movement of the exhaust liner 25 with respect to the engine casing 21' in a direction parallel to the radial direction 404 which might otherwise be liable to occur by virtue of a pressure differential between the bypass duct 22 and the core engine nozzle 20 (i.e., the pressure in the bypass duct 22 will typically be greater than the pressure in the core engine nozzle 20 during normal operating conditions, which may be referred to as favourable pressure conditions).

Referring in particular to FIG. 5, the housing 521 extends through a limited range between the engine casing 21' and the exhaust liner 25 (e.g., through the bypass duct 22) such that a clearance gap 541 is defined between the housing 521 and the exhaust liner 25. The clearance gap 541 allows for easy movement of the exhaust liner 25 relative to the engine casing 21' along the axial direction 402 (e.g., lateral movement). Further, a size of the clearance gap 541 may be chosen to allow for an expected amount of thermal expansion of the exhaust liner 25 and/or a lateral movement during use. Moreover, during a load-reversal event in which exhaust liner 25 is subject to "blow-back" and is forced towards the engine casing 21' (i.e., when the pressure in the bypass duct 22 is less than the pressure in the core engine nozzle 20, which may be referred to as adverse pressure conditions), the tension tie 511 is not able to oppose a decrease in the radial distance between the exhaust liner 25 and the engine casing 21' because the tension tie 511 is unable to support any substantial compressive load. Instead, the size of the clearance gap 541 may be chosen to determine a limited permitted decrease in the radial distance between the exhaust liner 25 and the engine casing 21' in use to prevent excessive decreased in the radial distance between the exhaust liner 25 and the engine casing 21' during such events.

The interior of the housing 521 is in fluidic communication with the bypass duct 22 via the clearance gap 541. Consequently, in use, relatively cold air in the bypass duct 22 (i.e., the bypass flow of air B) enters the interior of the housing to provide cooling to the tension tie 511, which may be heated as a result of thermal conduction from the exhaust liner 25. In addition, because the clearance gap 541 is defined between the exhaust liner 25 and the housing, relatively cold air in the bypass duct 22 may easily flow over the outer mount 421 to provide cooling thereto. This may reduce the temperature of the exhaust liner 25 in an area surrounding the inner mount 411, thereby reducing a degree to which areas of locally increased temperature ("thermal hotspots") may develop on or in the exhaust liner 25 in use. This is associated with reduced thermal deformation and/or reduced thermally induced stress concentrations within the exhaust liner 25.

In the example of FIGS. 4 and 5, each housing 521-528 also defines a plurality of inlets 551-558 located in the portion of the housing 521-528 which extends through the bypass duct 22. Each of the plurality of inlets 551-558 is configured for (e.g., to promote) gas exchange between the interior of the respective housing 521-528 and the bypass duct 22. This may provide yet further cooling to the tension tie 511 and/or to the inner mount 411. In other examples anticipated by the present disclosure, the housing(s) 521-528 may define only a single inlet 551-558 for this purpose.

Referring to FIG. 5 in particular once again, the tension tie 511 is spaced apart from an internal profile of the housing 521 throughout its extent through the housing 521. Spacing apart of the tension tie 511 and the housing 521 in this way enables easier assembly of the ducting arrangement 400 (e.g., during insertion of the tension tie 511 into the housing 521 for coupling with the inner mount 411) and eliminates the need for the use of precise manufacturing tolerances for the housing 521 and the tension tie 511. Moreover, spacing apart of the tension tie 511 and the housing 521 allows for movement of the tension tie 511 relative to the housing 521, which allows for a wide range of movement of the exhaust liner 25 relative to the engine casing 21' along the axial direction 402 (e.g., to allow for thermal expansion of the exhaust liner 25).

In this example, each attachment system 501-508 further comprises a ferrule 561 (shown by FIG. 5 only) and a cap 571-578 (shown by both FIGS. 4 and 5). The cap 571 is affixed to the housing 521 so as to seal the interior of the housing 521 from the exterior of the engine casing 21'. This reduces pressure losses in the bypass duct 22 by preventing gas from passing from the bypass duct 22 into the space radially outward of the external surface 21* via the housing 521. The tension tie 511 is provided with the ferrule 561. The ferrule 561 is a deformable element which is usable to fasten a first portion 551' of the tension tie 511 to a second portion 551" of the tension tie 511 so as to form a loop of the tension tie 511 engaging each of the mounts 411, 421. An opening is formed by the loop of the tension tie 511. As best shown by FIG. 5, each mount 411, 421 extends through the opening formed by the loop of the tension tie 511. The tension tie 511 therefore extends around each of the mounts 411, 421 to couple the mounts together 411, 421. The ferrule 561 thereby causes the tension tie to be coupled to each of the corresponding mounts 411-418, 421-428, as described in further detail below with reference to FIG. 6.

In this example, the housing 521 defines an engagement portion 581 (e.g., a housing engagement portion 581) and a complementary engagement portion 481 is fixedly attached to (and may be defined by) the exhaust liner 25' (e.g., an exhaust liner engagement portion 481 or an inner annular duct structure engagement portion 481). Each attachment system 501-508 is configured such that the housing engagement portion 581 is spaced apart from the exhaust liner engagement portion 481 along the radial direction 404 of the ducting arrangement 400 when the tension tie 511 has coupled the mounts 411-418, 421-428 together and thereby opposes any increase in the radial distance between the exhaust liner 25 and the engine casing 21'. This means that the housing engagement portion 581 and the exhaust liner engagement portion 481 do not positively engage each other when the tension tie 511 has coupled the mounts 411-418, 421-428 together.

However, the exhaust liner engagement portion 481 is configured to positively engage the housing engagement portion 581 if the radial distance between the exhaust liner 25 and the engine 21' were to increase, for example if the tension tie 511 were to structurally fail due to an excessive tensile load or cyclical fatigue (e.g., metal fatigue). If so, the exhaust liner engagement portion 481 engages the housing engagement portion 581 and therefore limits movement of exhaust liner 25 relative to the engine casing 21' along the radial direction 404. That is to say that the radial distance between the engine casing 21' and the exhaust liner 25 is limited by cooperation of the housing engagement portion 581 and the exhaust liner engagement portion 481. Consequently, even in the event of structural failure of the tension tie 511, an alignment of the exhaust duct 25 with respect to the engine casing 21' may be maintained within a predetermined range, thereby functioning as an auxiliary safety feature. This increases a safety of a gas turbine engine 10 in which the ducting arrangement 400 is incorporated.

In this specific example, the housing engagement portion 581 is generally in the form of a shoulder extending away from the internal surface of the housing 521. The shoulder defines an upper surface 591 which generally faces away from the exhaust liner 25 and towards the engine casing 21'. The exhaust liner engagement portion 481 is in the form of a hook which is configured to engage the upper surface 591 of the shoulder if the radial distance between the exhaust liner 25 and the engine 21' were to increase as described above.

Figure 6:
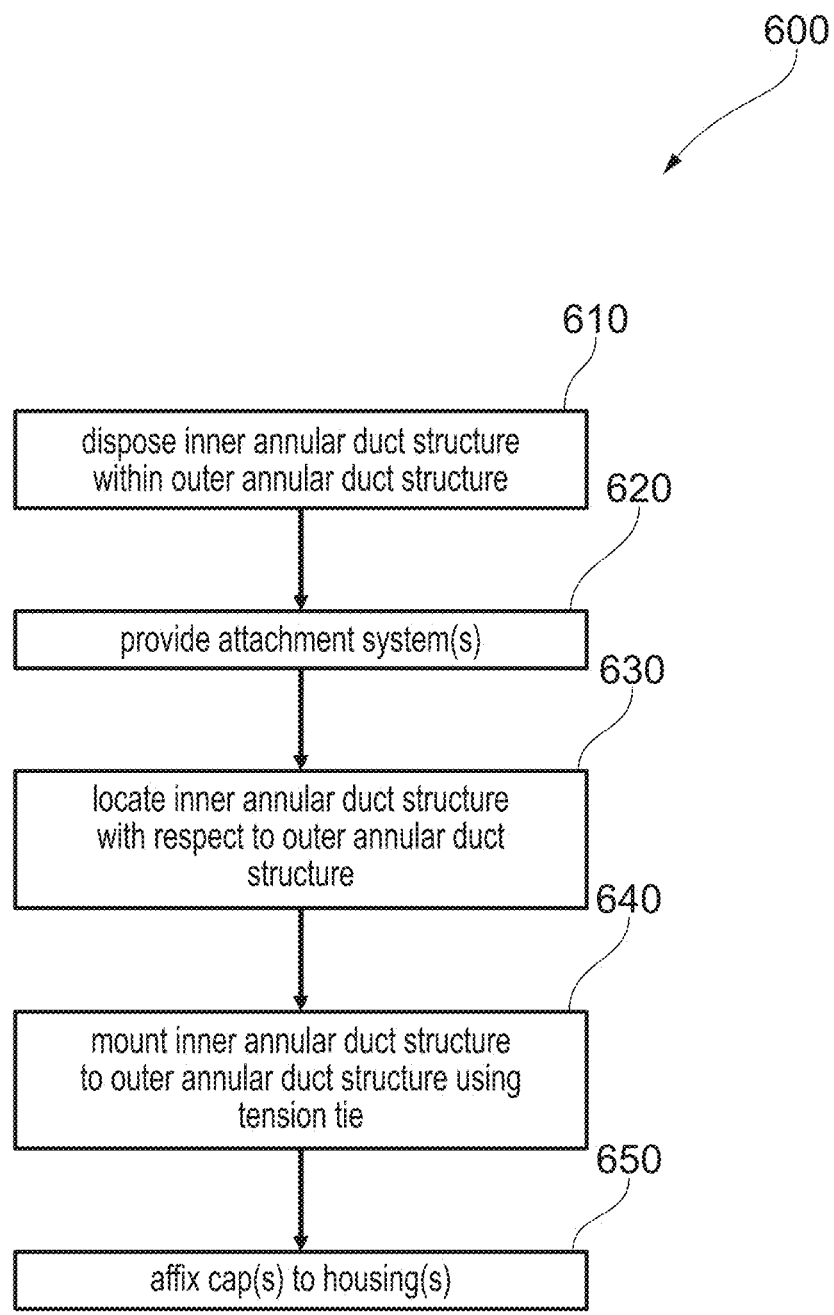
FIG. 6 is a flowchart which shows a method of assembling a ducting arrangement.

FIG. 6 is a flowchart which shows a method 600 of assembling a ducting arrangement for a gas turbine engine 10. The ducting arrangement 400 which is assembled as a result of the method 600 is generally accordance with (e.g., may have any suitable combination of the features of) the example ducting arrangement 400 described above with reference to FIGS. 4 and 5. Although the steps of the method 600 are described sequentially below, it will be understood that the steps may be performed in any suitable order.

The method 600 includes, at block 610, a step of disposing an inner annular structure at least partially inside an outer annular duct structure. The inner annular duct structure is generally in accordance with the inner annular duct structure 25 (e.g., the exhaust liner 25) described above with reference to FIGS. 4 and 5. Likewise, the outer annular duct structure is generally in accordance with the outer annular duct structure 21' (e.g., the engine casing 21') described above with reference to FIGS. 4 and 5.

The method 600 further includes, at block 620, at step of providing a plurality of housings. Each attachment system is generally in accordance with the housings(s) 521-528 described above with reference to FIGS. 4 and 5. More particularly, the step of providing, at block 620, the housing (s) 521-528 may include inserting the respective housing 521-528 through the corresponding aperture 531 in the outer annular duct structure 21' and causing the flange 521' of the respective housing 521-528 to abut the outer annular duct structure. The method 600 also includes, at block 630, a step of locating (e.g., rotating) the inner annular structure with respect to an outer annular duct structure such that each inner mount 411-418 is angularly aligned with a corresponding outer mount 421-428. Such circumferential alignment of these features is illustrated by FIG. 5.

In addition, the method 600 includes, at block 640, a step of mounting the inner annular duct structure 25 to the outer annular duct structure 21' using (e.g., by means of) a tension tie 511-518. The tension tie 511-518 forms a part of the respective attachment system 501-508 together with the corresponding housing 521-528 as described above. Specifically, the step of mounting, at block 640, of mounting the inner annular duct structure 25 to the inner annular structure 21' using the tension tie(s) 511-518 includes extending each tension tie (e.g., in sequence or in parallel) at least partially around each of the circumferentially extending reception surfaces 411-418, 421-428 to couple the mounts 411-418, 421-428 together before drawing the first and second portions 511', 511" of the tension tie 511 through the ferrule 561 to couple the tensile tie 511-5118 to the mounts 411-418, 421-428 and optionally to determine an initial amount of tensile stress which is generated within the tension tie according to an amount of mechanical strain (e.g., extension) of the tension tie 511 and subsequently deforming the ferrule 561 around the tension tie 511 to fix the position of the ferrule 561 with respect to the tension tie 511 by friction. Accordingly, the initial amount of tensile stress in the tension tie 511 may be precisely set during performance of this step of the method 600. A radial position of the housing 521 with respect to the engine casing 21' is thereby fixed as a consequence of the tensile stress generated in the tension tie 511 and the flange 521' of the housing 521 abutting the engine casing 21' (e.g., by cooperation of the flange 521' and the tension tie 511).

The method 600 also includes, at block 650, a step of affixing the cap 571-578 to the housing 521-528. The or each cap 571-578 may be affixed to the housing 521 by means of, for example, an adhesive, an interference fit, welding or brazing. The cap 571-578 forms a part of the respective attachment system 501-508 together with the corresponding housing 521-528 and the corresponding tension tie 511-518 as described above.

Various examples have been described, each of which feature various combinations of features. It will be appreciated by those skilled in the art that, except where clearly mutually exclusive, any of the features may be employed separately or in combination with any other features and the disclosure extends to and includes all combinations and sub-combinations of one or more features described herein.

It will also be appreciated that whilst the disclosure has been described with reference to aircraft and aircraft propulsion systems, the principles described herein could be used for many other applications. These include, but are not limited to, automotive, marine and land-based applications.

I claim:

1. A ducting arrangement for a gas turbine engine, the ducting arrangement comprising: an outer annular duct structure provided with an outer mount, and an inner annular duct structure provided with an inner mount, wherein:
   the inner annular duct structure is configured to be received within the outer annular duct structure such that the inner mount and the outer mount are angularly aligned;
   the inner mount and the outer mount are coupled together by a tension tie to attach the outer annular duct structure to the inner annular duct structure, the tension tie being a cable or a wire; and
   the tension tie is provided with a ferrule configured to fasten a first portion of the tension tie to a second portion of the tension tie to form a loop of the tension tie engaging each of the mounts.

2. The ducting arrangement of claim 1, wherein the tension tie is configured to oppose movement of the outer annular duct structure relative to the inner annular duct structure along a radial direction of the ducting arrangement.

3. The ducting arrangement of claim 1, wherein the tension tie forms part of an attachment system which further comprises a housing, and wherein the tension tie extends at least partially through an interior of the housing.

4. The ducting arrangement of claim 3, wherein the housing extends from one of the outer annular duct structure and the inner annular duct structure, and extends partially therebetween such that a gap is defined between the housing and an opposing one of the annular duct structures.

5. The ducting arrangement of claim 4, wherein
   the housing abuts the outer annular duct structure;
   the gap is defined between the housing and the inner annular duct structure.

6. The ducting arrangement of claim 3, wherein
   the outer mount is defined by the housing; and
   the inner mount is fixedly attached to the inner annular duct structure.

7. The ducting arrangement of claim 6, wherein the housing extends through an aperture formed in the outer annular duct structure.

8. The ducting arrangement of claim 7, wherein the housing includes a flange which abuts an outer surface of the outer annular duct structure.

9. The ducting arrangement of claim 7, wherein:
   the attachment system further comprises a cap affixed to the housing; and
   the cap seals the interior of the housing from an exterior of the outer annular duct structure.

10. The ducting arrangement of claim 3, wherein the housing defines at least one inlet for gas exchange between the interior of the housing and a gas passageway defined between the inner annular duct structure and the outer annular duct structure.

11. The ducting arrangement of claim 3, wherein the housing defines an engagement portion configured to cooperate with a complementary engagement portion fixedly attached to the inner annular duct structure to limit movement of the inner annular duct structure relative to the outer annular duct structure along a radial direction of the ducting arrangement.

12. The ducting arrangement of claim 11, wherein the engagement portion defined by the housing is in the form of a shoulder and the complementary engagement portion defined by the inner annular duct structure is in the form of a hook configured to engage the shoulder.

13. The ducting arrangement of claim 3, wherein the tension tie is spaced apart from the housing.

14. The ducting arrangement of claim 1, wherein
   the inner annular duct structure and the outer annular duct structure define a first gas passageway therebetween, the first gas passageway being configured to convey a bypass flow of air from a fan of the gas turbine engine;

the inner annular duct structure defines a second gas passageway, the second gas passageway being configured to convey an exhaust flow of air from a core of the gas turbine engine.

15. A gas turbine engine comprising the ducting arrangement of claim 1.

16. A ducting arrangement for a gas turbine engine, comprising: an outer annular duct structure provided with an outer mount, and an inner annular duct structure provided with an inner mount, wherein:

the inner annular duct structure is configured to be received within the outer annular duct structure such that the inner mount and the outer mount are angularly aligned;

the inner mount and the outer mount are configured to be coupled together by a tension tie formed by a cable or a wire to attach the outer annular duct structure to the inner annular duct structure; and the inner mount and the outer mount are each configured to extend through an opening of the tension tie.

17. The ducting arrangement of claim 16, wherein the inner mount and the outer mount each extend along a circumferential direction or an axial direction of the ducting arrangement to define respective surfaces for receiving the tension tie.

18. The ducting arrangement of claim 16, further comprising the tension tie, and wherein the tension tie at least partially extends around each of the mounts to couple the mounts together.

19. A ducting arrangement for a gas turbine engine, the ducting arrangement comprising: an outer annular duct structure provided with an outer mount, and an inner annular duct structure provided with an inner mount, wherein:

the inner annular duct structure is configured to be received within the outer annular duct structure such that the inner mount and the outer mount are angularly aligned;

the inner mount and the outer mount are coupled together by a tension tie to attach the outer annular duct structure to the inner annular duct structure, the tension tie being a cable or a wire;

the tension tie forms part of an attachment system which further comprises a housing, and wherein the tension tie extends at least partially through an interior of the housing; and the housing defines an engagement portion configured to cooperate with a complementary engagement portion fixedly attached to the inner annular duct structure to limit movement of the inner annular duct structure relative to the outer annular duct structure along a radial direction of the ducting arrangement.

\* \* \* \* \*